(12) United States Patent
Wolf et al.

(10) Patent No.: US 6,659,228 B2
(45) Date of Patent: Dec. 9, 2003

(54) APPARATUS FOR GREASING ROLLERS OF CONVEYOR BELT SYSTEMS

(75) Inventors: Tim Wolf, Pella, IA (US); James R. Dugger, Pella, IA (US)

(73) Assignee: Precision Pulley & Idler Co., Pella, IA (US)

( * ) Notice: Subject to any disclaimer, the term of this patent is extended or adjusted under 35 U.S.C. 154(b) by 86 days.

(21) Appl. No.: 09/972,538

(22) Filed: Oct. 8, 2001

(65) Prior Publication Data

US 2003/0066712 A1 Apr. 10, 2003

(51) Int. Cl.[7] ............................................... F16N 25/04
(52) U.S. Cl. ..................... 184/12; 198/500; 384/473; 384/474
(58) Field of Search ................ 184/12, 15.1, 15.2; 384/462, 471, 473, 474; 198/500, 501

(56) References Cited

U.S. PATENT DOCUMENTS

| | | | | |
|---|---|---|---|---|
| 1,737,036 A | * | 11/1929 | Wego | 384/474 |
| 3,198,318 A | * | 8/1965 | Brown | 384/480 |
| 3,243,243 A | * | 3/1966 | Diver et al. | 384/465 |
| 4,049,308 A | * | 9/1977 | Martin | 295/8 |
| 4,121,694 A | * | 10/1978 | Nelson | 184/6 |
| 4,334,720 A | * | 6/1982 | Signer | 384/465 |
| 4,858,427 A | * | 8/1989 | Provenzano | 60/39.08 |
| 4,919,253 A | * | 4/1990 | Morrison | 198/501 |
| 4,988,218 A | * | 1/1991 | Quaglia | 384/322 |
| 5,066,146 A | * | 11/1991 | McDonner | 384/473 |
| 5,259,671 A | | 11/1993 | Lowe et al. | |
| 5,306,090 A | | 4/1994 | Niwa et al. | |
| 5,553,870 A | | 9/1996 | Czekansky et al. | |
| 5,664,644 A | | 9/1997 | Reicks et al. | |
| 5,816,711 A | | 10/1998 | Gingrich | |

FOREIGN PATENT DOCUMENTS

| | | | |
|---|---|---|---|
| EP | 00549973 A1 | 7/1993 | |
| EP | 00549973 B1 | 7/1993 | |
| JP | 55155914 A | * 12/1980 | F16C/13/00 |

OTHER PUBLICATIONS

Dodge Bearing Engineering Catalog, pp. B7–24, 1999, Rockwell International Corp.

* cited by examiner

*Primary Examiner*—Chong H. Kim
(74) *Attorney, Agent, or Firm*—Sturm & Fix LLP

(57) ABSTRACT

A greasing system for conveyor belt rollers uses a depression formed in a shaft about which the roller rotates to permit grease to flow from a front side to a backside of a roller bearing. In this way grease can be applied to the bearing while the conveyor is operating. The grease then flows from the backside of the bearing, through the bearing and out an outlet on the front side of the bearing making it easy to determine when the bearing has been fully greased.

12 Claims, 4 Drawing Sheets

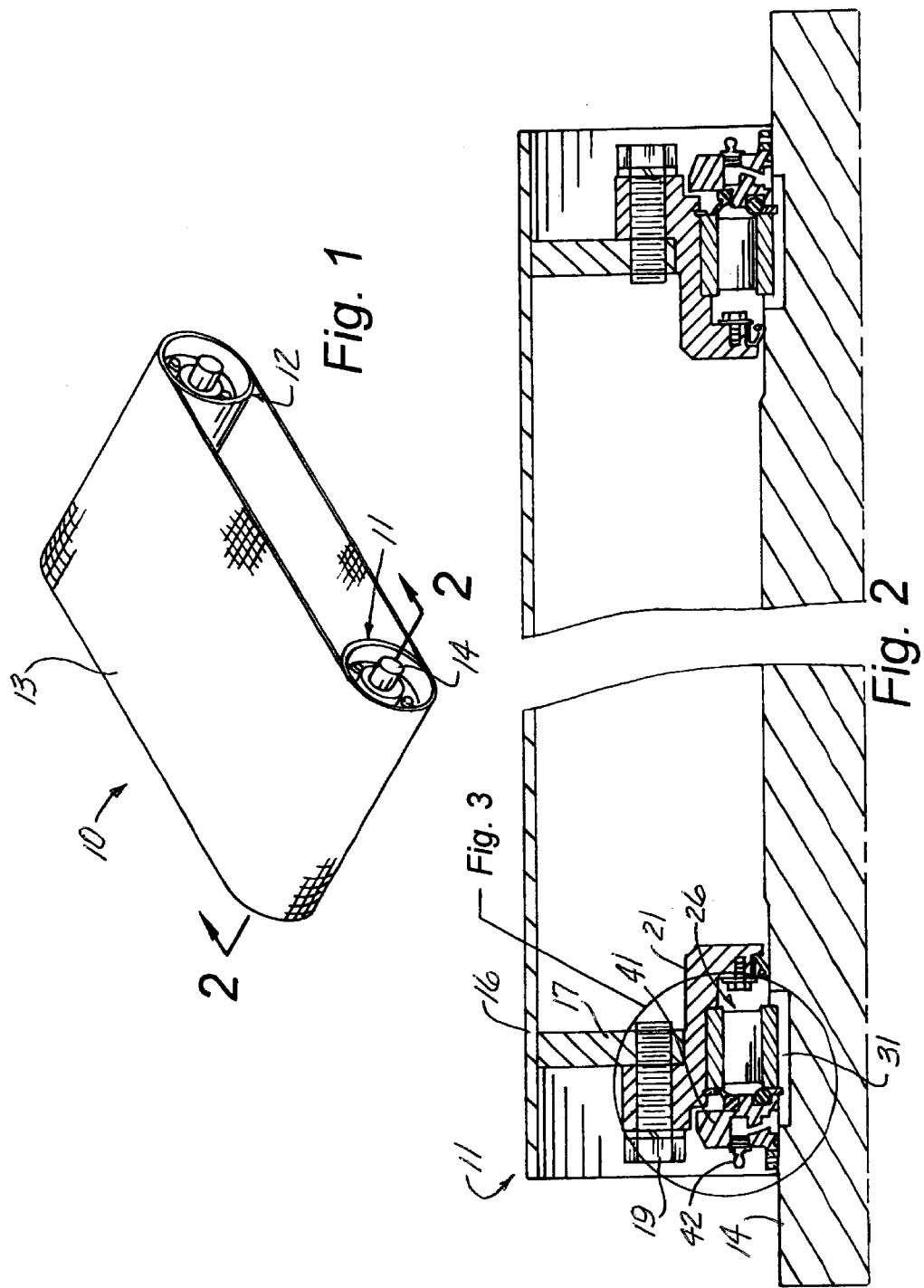

APPARATUS FOR GREASING ROLLERS OF CONVEYOR BELT SYSTEMS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The present invention relates generally to conveyors and more particularly to an apparatus for greasing the rollers of conveyor belt systems.

2. Description of the Related Art

In idler or pulley rollers for conveyor belts, there have been many devices made for greasing the bearings therein. One common way is to have a grease fitting in a rotating part of the roller with a passageway leading to the bearing. A problem with this solution is that the bearing cannot be greased "on the fly", meaning while the roller is moving.

Other systems, such as that shown in U.S. Pat. No. 5,664,644 to Reicks et al have ways of putting the grease fitting in the shaft itself so that the bearing can be lubricated while the rotating part is moving. That way the conveyor system can continue to operate while grease is applied to the bearings thereof. In the aforementioned Reicks et al patent, an axial drilling must be made along the center of the shaft and radial borings must also be made in order to transport the grease to the back side of a bearing so that the bearing can be greased while the roller is moving. This is a fairly expensive operation and will weaken the structure integrity of the shaft, if not, perhaps, requiring a larger shaft than would otherwise be necessary.

Accordingly, there is a need for a grease distribution system for conveyor belt rollers which will overcome the aforementioned problems.

SUMMARY OF THE INVENTION

The present invention relates to a conveyor belt greasing apparatus for rollers having a shaft with a roller adapted to support a portion of the conveyor belt. The roller includes a radially inwardly facing portion on at least one end thereof and has a bearing disposed in the radially inwardly facing portion. The bearing has an inner and an outer race rotatable with respect to each other and has movable bearing members disposed between the inner and outer races for reducing friction when one of the inner or outer races rotates with respect to the other one. An annular member is operatively disposed on the shaft adjacent to the bearing and is fixed with respect to the shaft.

A first annular seal is disposed around the shaft for sealing between the shaft and the annular member. A second annular seal is in place for sealing between the roller and the shaft as the roller rotates with respect to the shaft. A first grease chamber in the roller is positioned between the second annular seal and one end of the bearing and a second grease chamber is positioned adjacent to the other end of the bearing. A depression in the shaft extends from a first end between the first seal member and the other end of the bearing and a second end of the depression is disposed between the second annular seal member and the bearing. The second end of the depression is in fluid communication with the first grease receiving chamber. A passageway in the annular member has a grease supply port on one end thereof and an annular portion on the other end thereof so that the annular portion of the passageway is in fluid communication with the first end of the depression and the shaft. A grease outlet is provided adjacent to the second grease chamber to allow grease to exit therefrom. This arrangement allows grease to enter the inlet of the passageway, pass into the annular outlet portion of the passageway to the first end of the depression in the shaft. Then the grease will pass out the second end of the depression in the shaft to the first grease receiving chamber. From there the grease will pass through the bearing to the second grease receiving chamber and then out of the grease outlet.

An object of the present invention is to provide an improved grease distribution system for conveyor belt rollers.

Another object of the present invention is to provide a greasing system which allows conveyor belt rollers to be greased "on the fly" so that the conveyor belt system does not need to be shut down in order to grease the bearings of the rollers.

A still further object of the present invention is to provide a system whereby grease can be applied on one side of the bearing but such grease flows first to the opposite side of the bearing and then out the side close to the inlet of the grease fitting so that the person applying the grease can easily determine when the bearing has been completely supplied with grease.

A still further object of the present invention is to permit a slot to be milled in the shaft to form a grease passageway to the back side of the bearing which is cheaper than other ways to get grease to the back side of a bearing in a conveyor roller system.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a simplified conveyor belt system;

FIG. 2 is a cross sectional view taken along line 2—2 but only showing the top half thereof;

DETAILED DESCRIPTION OF THE INVENTION

Figure 3:
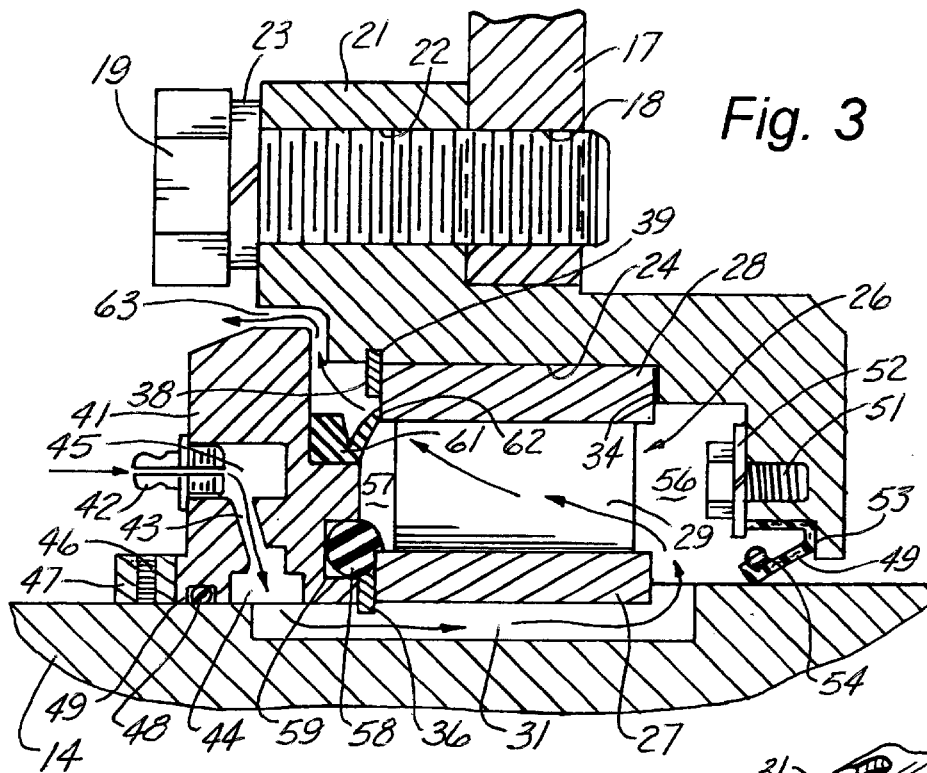
FIG. 3 is an enlarged cross sectional view taken along line 2—2 of FIG. 1 but showing only the part circled, indicated as FIG. 3 in FIG. 2.

Referring now to the drawings wherein like reference numerals designate identical or corresponding parts throughout the several views, FIG. 1 shows a conveyor belt system (10) constructed in accordance with the present invention and having a first roller (11), a second roller (12) and a flexible conveyor belt (13) disposed around the rollers (11) and (12). One of these rollers (11) and (12) is a driving pulley and the other one typically an idler roller for example. Roller (11) could be the idler pulley wherein the central shaft (14) remains stationary while the roller (11) rotates around the shaft (14).

Turning to FIGS. 2 and 3, the top part of the roller (11) and the top part of the shaft (14) are shown in cross section. The roller (11) is comprised of an outer cylindrical member (16), for example a sheet of steel, typically welded to a disc (17). This disc (17) has a plurality of threaded openings (18) therein for receiving a threaded bolt (19). Roller housing (21) has openings (22) therein for receiving the bolts (19). Lock washers (23), shown in FIG. 3, are used to prevent the bolt (19) from becoming loose due to vibration or the like. The housing (21) has a radially inwardly facing portion (24) which is cylindrical in the embodiment shown.

A bearing (26) has an inner race (27), an outer race (28) and roller members (29) between the inner race (27) and the outer race (28). This bearing (26) must have grease supplied to it at all times to present premature failure thereof.

Figure 4:
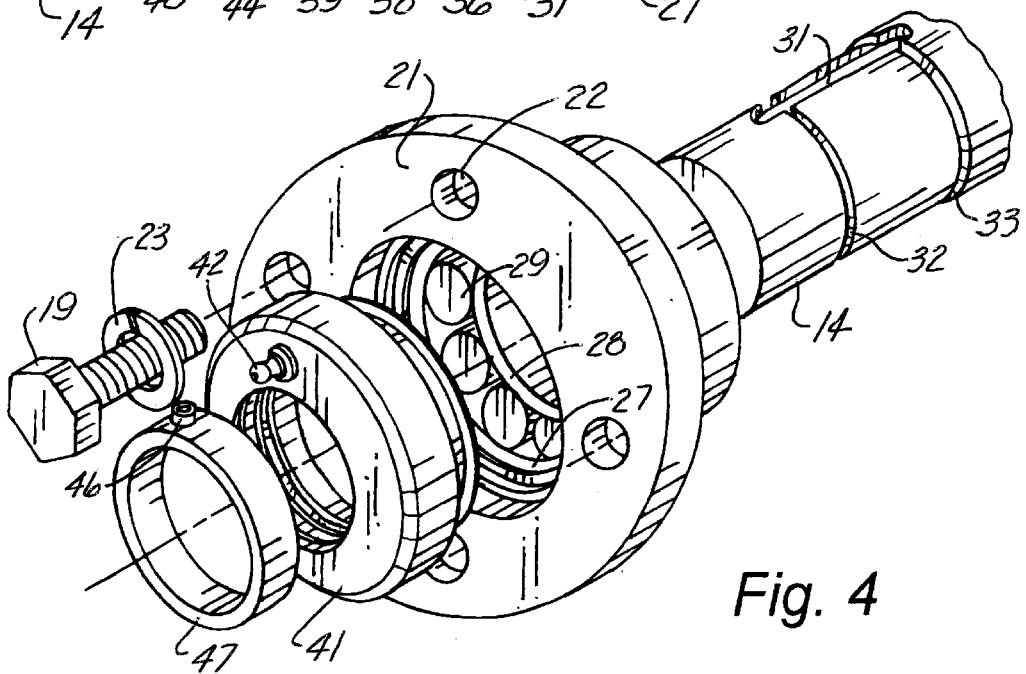
FIG. 4 is a perspective view of the various parts of the invention shown in FIGS. 1–3 in an exploded perspective view.
Figure 5:
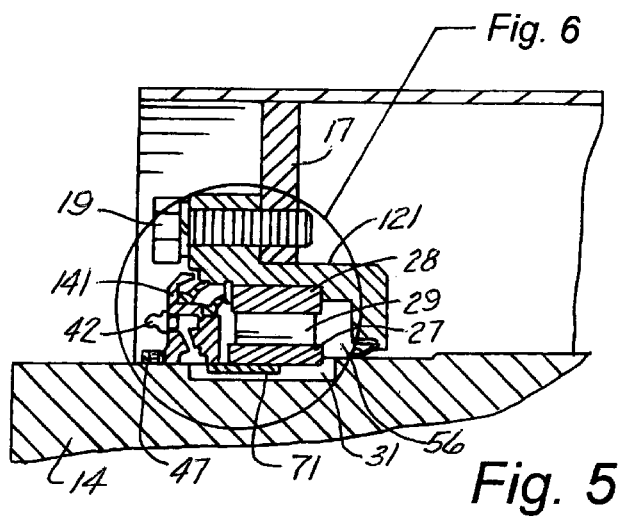
FIG. 5 is a view similar to FIG. 2 but showing an alternate embodiment.

FIGS. 2, 3 and 4 show a milled depression (31) in shaft (14). This milled depression can be of other configurations than the one shown. There could be more than one milled depression (31). However, one of the advantages of this invention is that there need be only one depression (31) in the shaft (14). FIG. 4 also shows an annular groove (32) for receiving an inner snap ring (36) as shown in FIG. 3. FIG. 4 also shows a shoulder (33) on shaft (14) for abutment with the inner race (27) of bearing (26).

A shoulder (34) on housing (21) is provided so that the outer race (28) can abut the shoulder (34) to position the bearing (26) with respect to the pulley housing (21). An outer snap ring (38) is disposed in an annular opening (39) in bearing housing (21) and holds the outer race (28) against the shoulder (34) to keep the outer race (28) in place. Similarly, the inner race (27) is held against shoulder (33) on shaft (14) by the annular snap ring (26) which goes around the shaft (14) in annular groove (32).

An annular member (41) has a grease fitting (42) which provides an inlet for grease to a passageway (43) which leads to an annular opening (44) around the inner periphery of the annular member (41). The annular member (41) is held in place on the shaft (14) by a set screw (46), which extends through a threaded opening in an annular flange (47). This annular flange (47) is pushed against the annular member (41) toward the bearing (26) so that a first annular 0-ring seal (48) in groove (49) seals grease from flowing from annular passageway (44) past the seal (48).

A second O-ring seal (49) is attached to the pulley housing (21) by bolts (51) so that the washer (52) against the seal (49) holds it in place against a shoulder (53) and a spring steel ring (54) pulls the lower part of the second seal (49) into sealing contact with the shaft (14) so that when the roller housing (21) rotates, the second seal (49) will maintain contact with the shaft (14). This forms a first grease receiving chamber (56) on one side of the bearing (26). A second grease receiving chamber (57) is formed on the other side of the bearing (26). A third seal (58) in an annular groove (59) in annular member (41) keeps grease from passing from the depression (31) into the grease receiving chamber (57). A fourth seal (61) is glued into place in the position shown on annular member (41) and has a lip (62) which is biased against the outer race (28) so it will seal while the outer race (28) rotates with respect to the seal (61).

In operation of the embodiment shown in FIGS. 1–4, the rotation of the roller (11) can continue and the conveyor belt system (10) can continue to operate while grease is applied to grease fitting (42). Grease flows from the fitting (42) into opening (45) which forms a passageway in the annular member leading through passageway (43) into an annular portion (44) of the passageway in annular member (41). It is to be understood that the annular member (41) will remain stationary with respect to the shaft (14) which in the example shown is also stationary. The grease will continue to flow from the inlet grease fitting into one end of the depression (31) and out the other end of the depression (31) into a first grease receiving chamber (56).

It will be appreciated that the seal (49) prevents the grease from leaking out at the position of the seal (49) so that continued pumping of grease into the inlet fitting (42) will cause grease to fill the first grease receiving chamber (56). Then the grease will continue to move through the spaces between the rollers (29) and the inner race (27) and outer race (28). This grease will eventually completely fill a second grease receiving chamber (57). When chamber (57) is full, it will begin to pass between lip (62) of seal (61) in the outer race (28). Eventually this grease will pass out an annular opening (63) between the pulley housing (21) and the annular member (41). When the person applying the grease to this system sees grease exiting through this passageway (63), that will be an indication that the bearing has been fully greased. This is easier than if the exit for the grease is located somewhere out of sight to a person while applying grease to grease inlet fitting (42). Consequently, the roller (11) circular portion (17), pulley housing (21) and outer race (28) will rotate around the shaft (14) and inner race (27), with rollers (29) constantly rotating in the grease therebetween. The seal arrangement (58) prevents grease from short-circuiting from annular passageway (44) or depression (31) into the second grease receiving chamber (57). Failure to seal at this point would prevent the grease from being properly applied to the space between the rollers (29).

Referring now to the embodiment of FIGS. 5–8, all of the parts from the FIGS. 1 through 4 are the same except for a few parts which will be discussed below. Like parts have the same numbers in FIGS. 3 and 6. Instead of using a third seal (58) as shown in FIG. 3, a third seal (158) is used to prevent grease from short-circuiting into the second grease receiving chamber (57).

Figure 6:
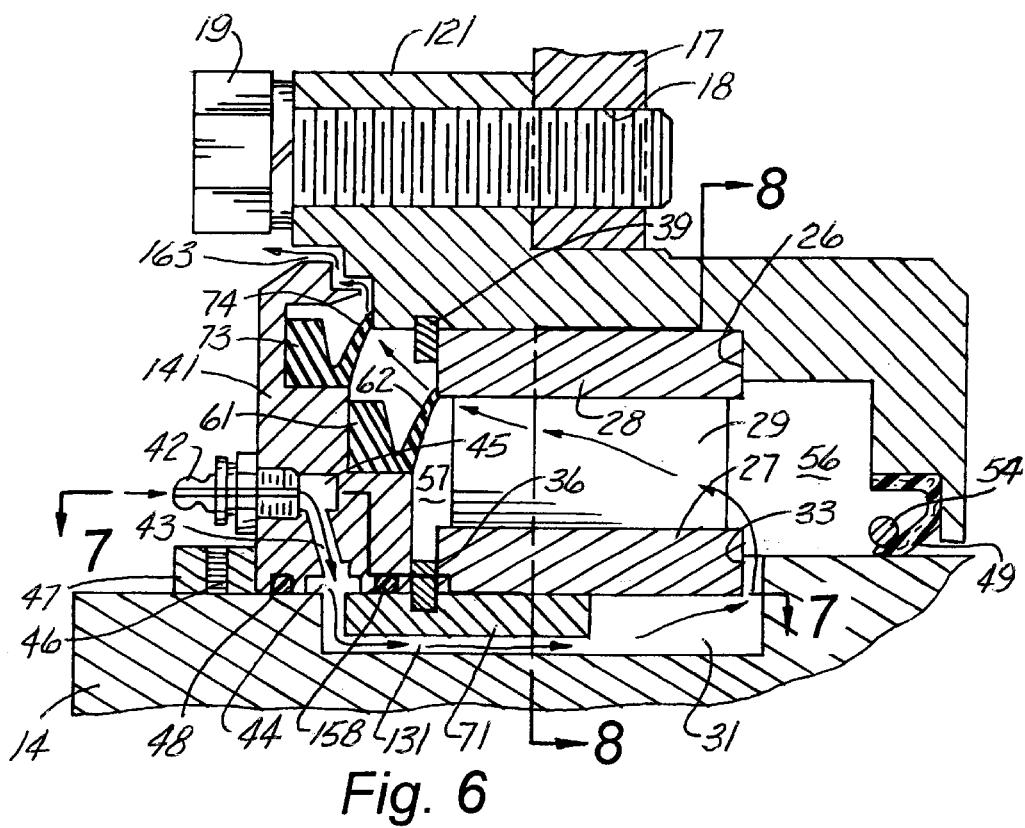
FIG. 6 is an enlarged cross sectional view showing the part circled in FIG. 5.
Figure 7:
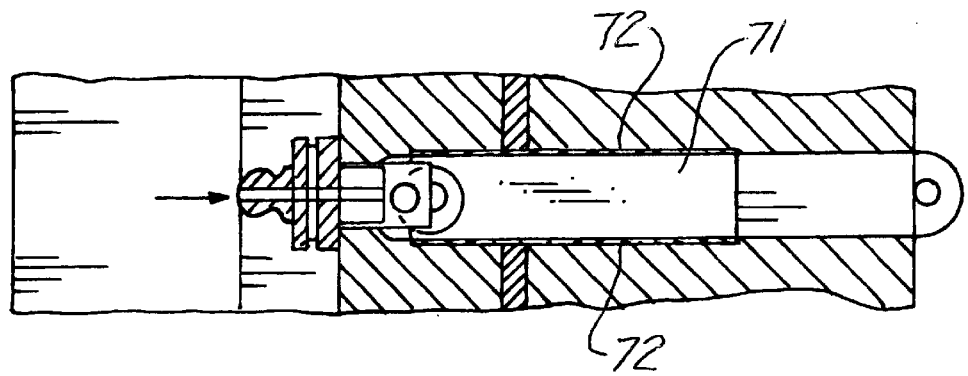
FIG. 7 is a cross sectional view taken along line 7—7 of FIG. 6 and showing how a key is glued into the milled opening in the shaft.
Figure 8:
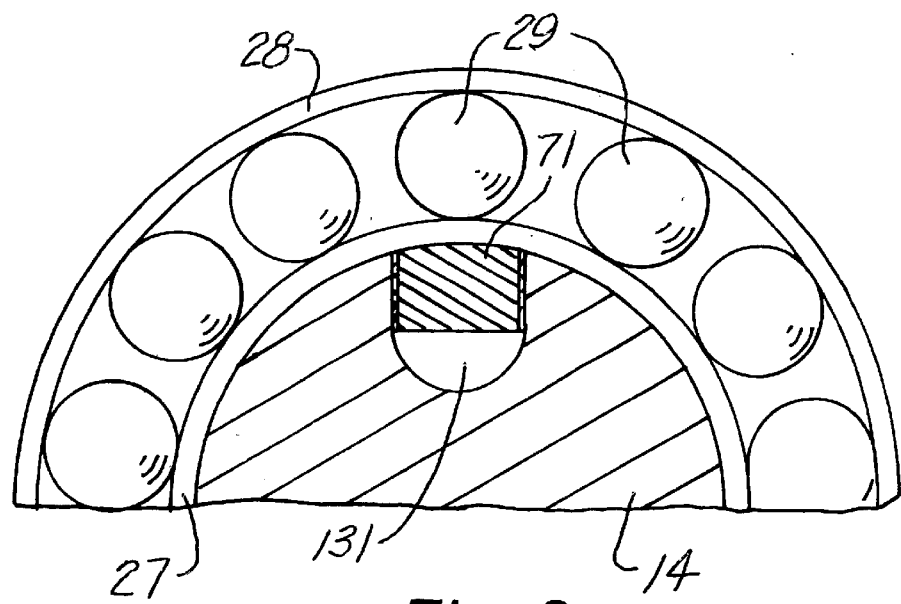
FIG. 8 is an enlarged cross sectional view taken along line 8—8 of FIG. 6.

FIGS. 6 and 7 show a key (71) which is glued into the depression (41) by adhesive (72). This key (71) is short enough to form a passageway (131) below the key (71) and the key is not only held in position by the adhesive (72), but also by the snap ring (36). The configuration of annular member (141) is slightly different than annular member (41) of FIG. 3 to provide a place for a fifth seal (73) with a lip (74) which seals against housing (121). A grease outlet (163) between the pulley housing (121) and the annular member (121) is of a slightly different configuration than outlet (63) of FIG. 3, but this configuration than doesn't really matter as long as there is a space for grease to pass out therefrom. Otherwise the embodiment of FIGS. 6–8 operates exactly in the way explained above with respect to the embodiment of FIGS. 1–4.

Accordingly it will be appreciated that the preferred embodiments disclosed herein do indeed accomplish the aforementioned objects. Obviously many modifications and variations of the present invention are possible in light of the above teachings. It is therefore to be understood that, within the scope of the appended claims, the invention may be practiced otherwise than as specifically described.

We claim:

1. A belt conveyor greasing apparatus for rollers comprising:
   (a) a shaft;
   (b) a roller adapted to support a portion of a conveyor belt, the roller including a radially inwardly facing portion on at least one end of the roller;
   (c) a bearing disposed in said radially inwardly facing portion, said bearing having an inner and an outer race rotatable with respect to each other and having movable bearing members disposed between the inner and outer races for reducing friction when one of the inner and outer races rotates with respect to the other one;
   (d) an annular member operatively disposed on said shaft adjacent to said bearing and fixed with respect to said shaft;
   (e) a first annular seal disposed around the shaft for sealing between the shaft and the annular member;
   (f) a second annular seal for sealing between the roller and said shaft as the roller rotates with respect to the shaft;
   (g) a first grease chamber in the roller between the second annular seal and one end of the bearing;
   (h) a second grease chamber adjacent the other end of the bearing;
   (i) a depression in said shaft, said depression extending from a first end between the first seal member and the other end of said bearing and a second end between the second annular seal member and said bearing, said second end of said depression being in fluid communication with said first grease receiving chamber;
   (j) a passageway in said annular member having a grease supply port on one end thereof and a substantially annular portion on the other end thereof, said annular portion of the passageway being in fluid communication with said first end of the depression in said shaft;
   (k) a grease outlet for the second grease chamber to allow grease to exit therefrom whereby grease can enter the inlet of said passageway, pass into the substantially annular portion of the passageway to said first end of the depression in the shaft, pass out the second end of the depression in the shaft to said first grease receiving chamber, pass through the bearing to said second grease receiving chamber and then out said grease outlet; and
   (l) another annular seal which seals between said annular member and the outer race of the bearing and forming a portion of a wall of the second grease receiving chamber;
   wherein said another annular seal is in direct contact with the outer race of the bearing.

2. The mechanism of claim 1 including a further annular seal between the first and second annular seals, said further annular seal being disposed around the shaft to prevent grease from passing directly from the depression to the second grease receiving chamber.

3. The mechanism of claim 1 including a fifth annular seal for sealing between the annular member and the roller.

4. The mechanism of claim 1 wherein the inner race has one end and an other end and wherein the mechanism includes an inner snap ring for holding the other end of the inner race from movement with respect to the shaft.

5. The mechanism of claim 4 including a shoulder on said shaft in abutment with said one end of the inner race for holding the inner race between the shoulder and said inner snap ring.

6. The mechanism of claim 1 wherein the outer race has one end and an other end and wherein the mechanism includes an outer snap ring for holding the other end of the outer race from movement with respect to said roller.

7. The mechanism of claim 6 including a shoulder on the roller in abutment with said one end of the outer race for holding the outer race between the shoulder and the outer snap ring.

8. The mechanism of claim 2 wherein a key is disposed in a portion of said depression.

9. The mechanism of claim 8 wherein said further annular seal surrounds a portion of the depression in the shaft which has said key therein.

10. The mechanism of claim 2 wherein the inner race has one end and an other end and wherein said further seal is disposed between the annular member and said other end of the inner race.

11. The mechanism of claim 1 wherein the second annular seal is disposed on said roller and rotates with the roller.

12. The apparatus of claim 1 wherein said another seal is fixed with respect to the shaft.

* * * * *